(12) United States Patent
Anderson

(10) Patent No.: US 9,302,797 B2
(45) Date of Patent: Apr. 5, 2016

(54) TRUSS PLATE STACKING APPARATUS

(71) Applicant: Simpson Strong-Tie Company, Inc., Pleasanton, CA (US)

(72) Inventor: William W. Anderson, Edenton, NC (US)

(73) Assignee: SIMPSON STRONG-TIE COMPANY, INC., Pleasanton, CA (US)

( * ) Notice: Subject to any disclaimer, the term of this patent is extended or adjusted under 35 U.S.C. 154(b) by 0 days.

(21) Appl. No.: 13/887,946

(22) Filed: May 6, 2013

(65) Prior Publication Data

US 2013/0294878 A1 Nov. 7, 2013

Related U.S. Application Data

(60) Provisional application No. 61/643,057, filed on May 4, 2012.

(51) Int. Cl.
| | |
|---|---|
| *B65B 35/00* | (2006.01) |
| *B65B 35/56* | (2006.01) |
| *B65B 13/00* | (2006.01) |
| *B65G 57/081* | (2006.01) |
| *B65B 27/02* | (2006.01) |
| *B65B 27/08* | (2006.01) |
| *B65B 35/50* | (2006.01) |

(52) U.S. Cl.
CPC ................ *B65B 13/00* (2013.01); *B65B 27/02* (2013.01); *B65B 27/08* (2013.01); *B65B 35/50* (2013.01); *B65B 35/56* (2013.01); *B65G 57/081* (2013.01)

(58) Field of Classification Search
CPC .............................. B65B 35/56; B65G 57/081
USPC ................ 198/374, 381, 400, 402, 404, 406, 198/418.6, 436, 447, 575; 414/791.4, 414/793.2, 794.4; 53/143, 442, 447, 542, 53/544

See application file for complete search history.

(56) References Cited

U.S. PATENT DOCUMENTS

| | | | | |
|---|---|---|---|---|
| 2,791,315 | A * | 5/1957 | Chapman | 198/444 |
| 3,043,070 | A * | 7/1962 | Cammack | 53/544 |
| 3,224,550 | A * | 12/1965 | Nigrelli et al. | 198/444 |
| 3,253,694 | A * | 5/1966 | Kinney | 198/374 |
| 4,265,354 | A * | 5/1981 | Sinnema | 198/374 |
| 4,440,289 | A * | 4/1984 | Weis | 198/448 |
| 5,161,665 | A * | 11/1992 | Cragun | 198/448 |
| 5,678,395 | A * | 10/1997 | Black, Jr. | 53/542 |
| 5,820,335 | A * | 10/1998 | Croteau et al. | 414/788.3 |
| 5,906,264 | A * | 5/1999 | Black et al. | 198/374 |
| 6,257,824 | B1 * | 7/2001 | Selm et al. | 414/754 |
| 6,468,024 | B2 * | 10/2002 | Bishop et al. | 414/788.3 |
| 2010/0071318 | A1 * | 3/2010 | Brandhorst et al. | 53/446 |

* cited by examiner

*Primary Examiner* — Gregory Adams
(74) *Attorney, Agent, or Firm* — Vierra Magen Marcus LLP

(57) ABSTRACT

An apparatus for stacking truss plates, each truss plate having a flat side and a pronged side, receives an odd number of plates. An even number of input channels underlie a stationary shelf and a movable shelf. The channels receive a first odd set of plates in a first cycle with the movable shelf in a first position, each of the first plates being received and falling input channels during the first cycle. The channels receive a second odd set of plates during a second cycle, the movable shelf in a second position during the second cycle. A roller and transport track assembly move each of the odd number of plates to an output so that an even number of plates is output during each cycle.

20 Claims, 18 Drawing Sheets

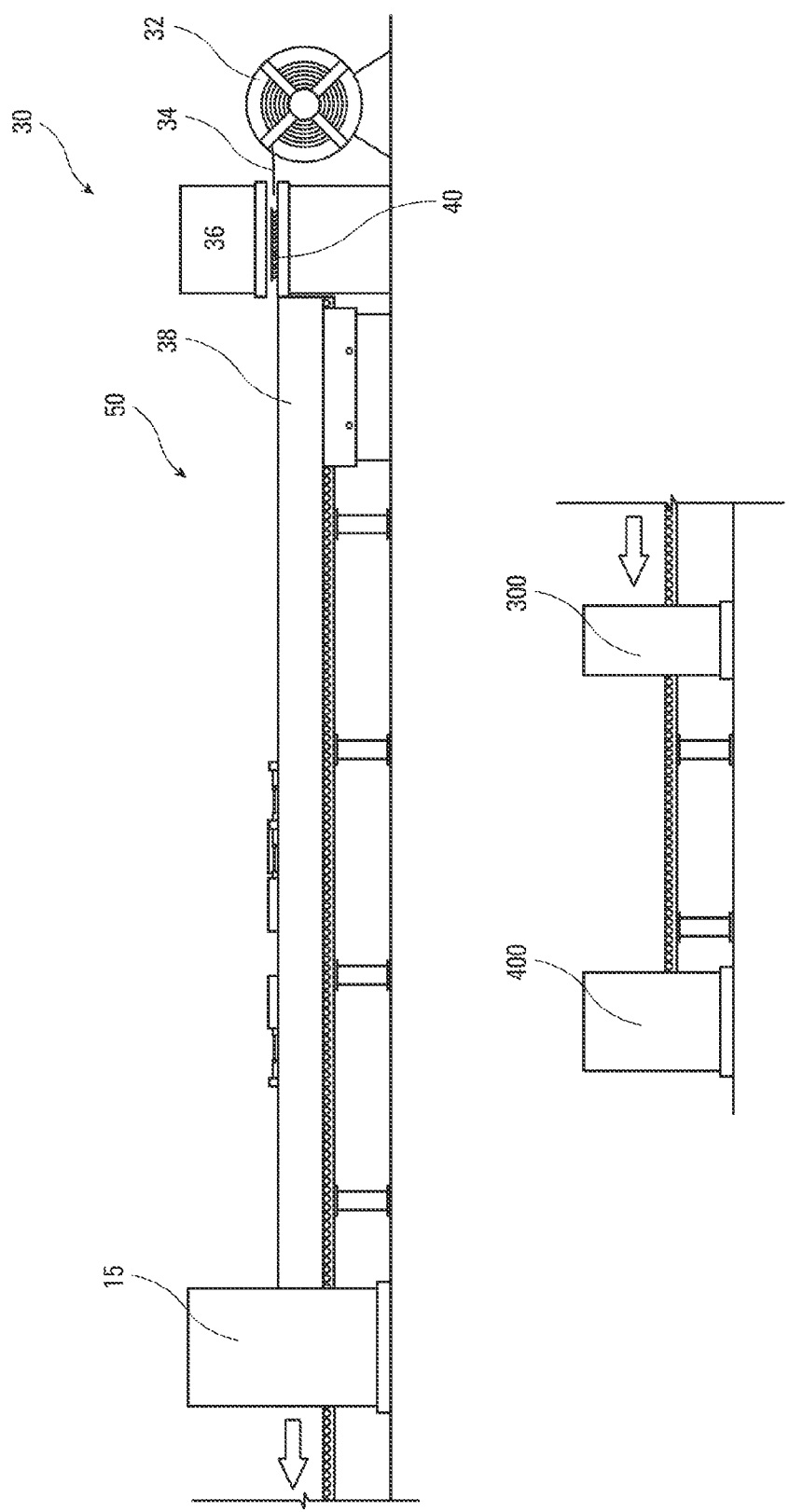

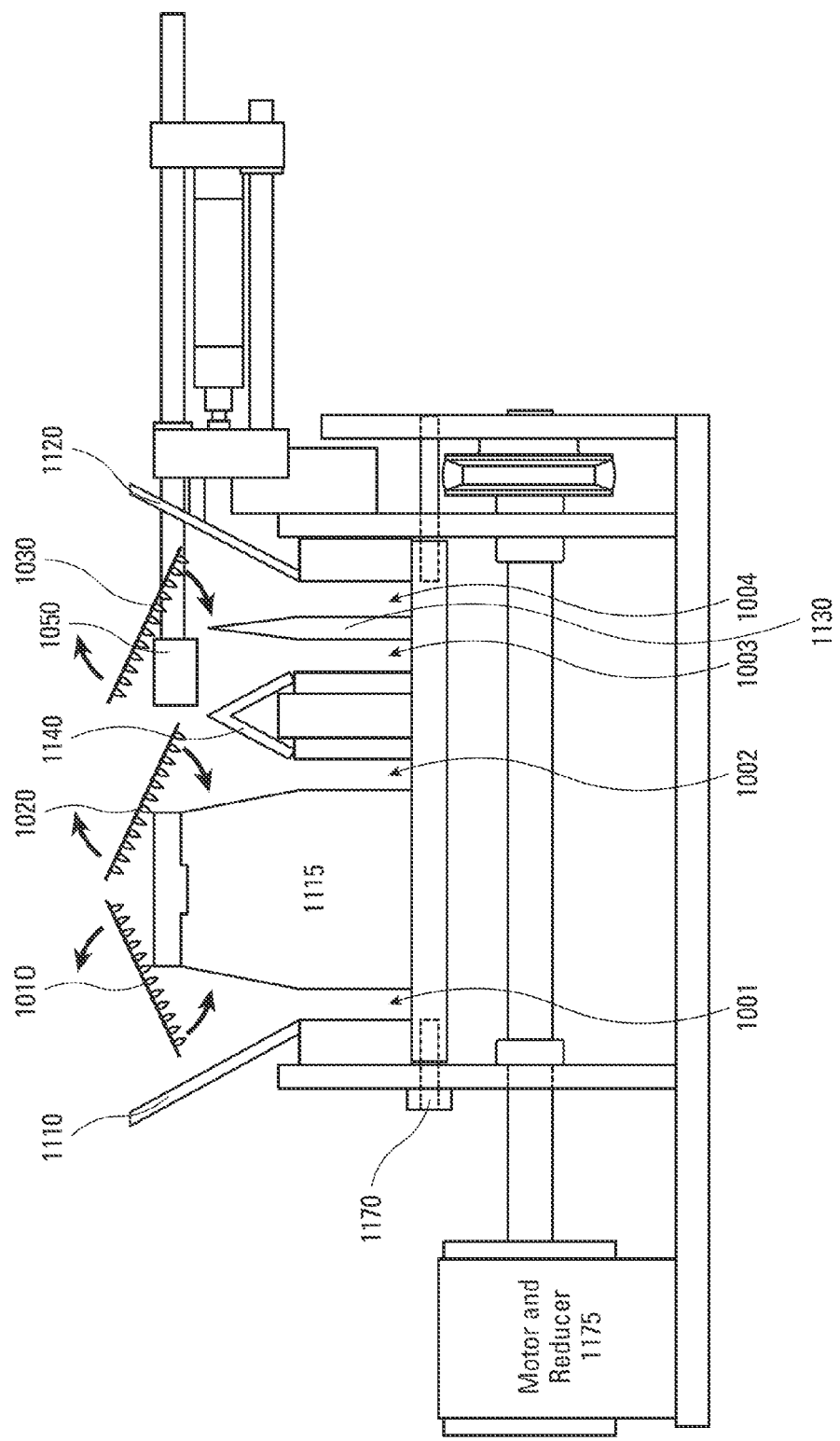

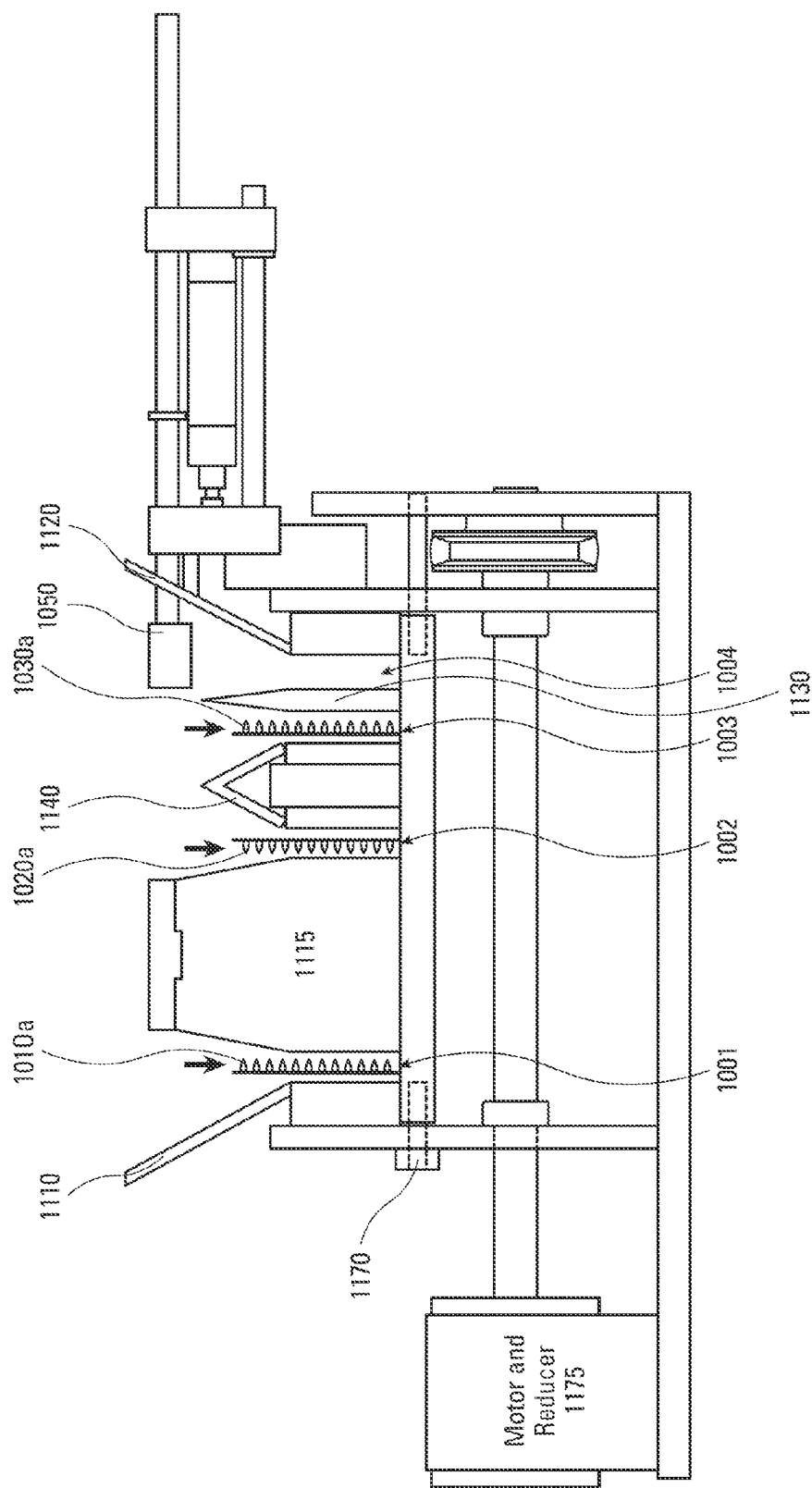

TRUSS PLATE STACKING APPARATUS

CLAIM OF PRIORITY

This application is a continuation of U.S. Patent Provisional Application No. 61/643,057 filed on May 4, 2012 entitled "TRUSS PLATE STACKING APPARATUS", which application is incorporated herein by reference in its entirety.

BACKGROUND

Truss plates are used to join planks of lumber that form floor and roof trusses used in residential housing. Truss plates typically comprise a backing plate and an array of sharp spike-like prongs or impaling members that extend outwardly from the backing plate. Adjacent planks of a truss with coplanar surfaces can be permanently joined by pounding or pressing the backing member of a truss plate so that its impaling members penetrate the planks.

Truss plates are typically packaged in boxes or cartons. The truss plates are arranged so that their respective backing members are substantially parallel, with the peripheries of the backing members being substantially aligned. The truss plates are then interconnected with some interconnecting means, such as a strap that snugly wraps around the truss plates, to form a unitized bundle. Such a bundle can be conveniently shipped, stored, and handled in the manufacture of trusses.

Prior art machines for bundling truss plates receive an even number of plates, such as two or four plates, and provide the same even number of output plates in a paired, adjacent relationship.

SUMMARY

In one embodiment, technology for automated stacking of truss plates such than an odd number of plates emanating from a rolled press can be rapidly stacked in pairs over the course of manufacturing cycles. An apparatus for stacking truss plates, each truss plate having a flat side and a pronged side, receives an odd number of plates. An even number of input channels underlie a stationary shelf and a movable shelf. The channels receive a first odd set of plates in a first cycle with the movable shelf in a first position, each of the first plates being received and falling input channels during the first cycle. The channels receive a second odd set of plates during a second cycle, the movable shelf in a second position during the second cycle. A roller and transport track assembly move each of the odd number of plates to an output so that an even number of plates is output during each cycle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a schematic view of a truss plate bundle packaging apparatus.

FIGS. 5A-5H are end view diagrams illustrating entrance of plates into the entrance channels over two cycles.

DETAILED DESCRIPTION

Technology is provided which allows the creation and automated stacking of truss plates such than an odd number of plates emanating from a rolled press can be stacked in pairs over the course of manufacturing cycles.

Figure 1B:
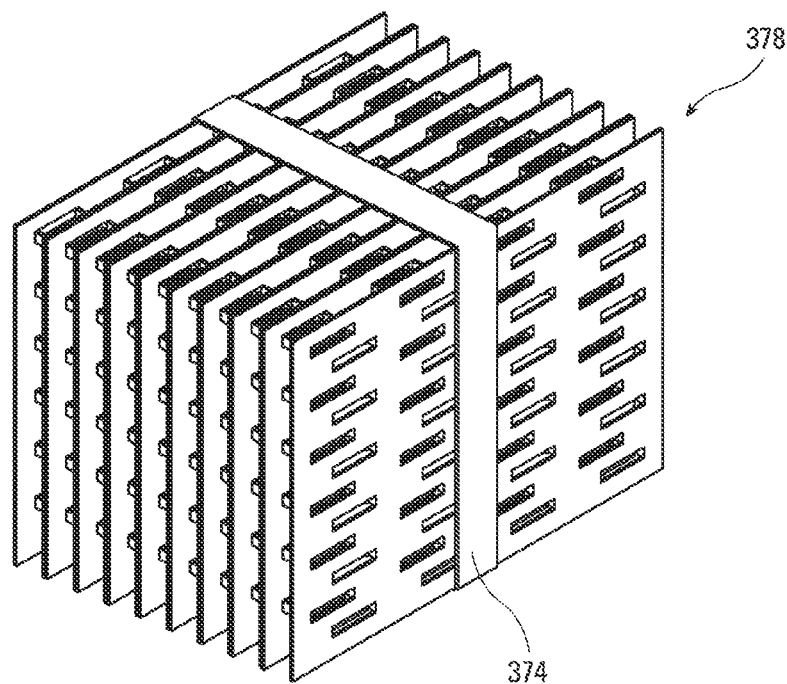
FIG. 1B is a perspective view of a truss plate bundle.

FIG. 1a illustrates the general configuration of a truss plate packaging apparatus 30. The packaging apparatus 30 comprises a take-out wheel 32 that provides sheet material 34, a stamping press 36 that forms truss plates 40, an orientation or stacking station 50 that orients the truss plates 40 formed at the stamping press 36 so that their backing members are substantially parallel to a predetermined plane, an alignment station 100 that aligns the truss plates, a stacking station 15 that stacks the oriented and aligned truss plates into a truss plate stack, a banding station 300 that encircles truss plate stacks with a interconnecting strap 374 to produce a truss plate bundle 378 (FIG. 1b), and an offloading station 400 that stacks the truss plate bundles 378 into a predetermined configuration on a pallet for final enclosure and shipping.

The coil reel 32 (FIG. 1a) stores a sheet material 34, which is typically steel, in rolled form and provides it to the stamping press 36. The sheet material 34 is of a (measured in the transverse direction) that an odd number (i.e., three) of truss plates can be formed simultaneously from a single transverse strip of material, although virtually any number of truss plates formed from a single transverse strip of material can be used. For example, three four-inch square plates can be made from a 12-inch wide roll of steel. The take-out wheel 32 can be any known to those skilled in this art for providing sheet material to the stamping press 36; the skilled artisan will appreciate that other means for providing material to the stamping press 36 for truss plate formation, such as a roll-forming unit, can also be used with the present invention.

The stamping press 36 (FIG. 1a) receives sheet material 34 and forms truss plates 40 therefrom. The truss plates 40 include a generally planar backing member and a plurality of impaling members that extend from one side thereof. The stamping press 36 slices the sheet material 34 longitudinally, strikes out the impaling members of individual truss plates, then slices the sheet material to form truss plates 40 having backing members of the desired size. The stamping press 36 forms for example, three truss plates simultaneously, and strikes out impaling members.

The stamping press 36 may be configured so that, as the truss plates emerge therefrom, impaling members extend downwardly. Those skilled in this art will appreciate that, although the aforementioned stamping press 36 is used, other stamping presses, and indeed other apparatus for forming truss plates, such as roll forming, can also be used.

The truss plates (shown in FIG. 1b formed into a bundle) can take a variety of dimensions. The impaling members can be arranged in perpendicularly disposed linear rows and columns, in linear columns with staggered rows, or other arrangements. The impaling members may be arranged so that two truss plates can be formed into a cooperating pair, in which the truss plates are in overlying contacting parallel relationship and in which the impaling members of each of the truss plates of the pair extend toward the backing member of the other truss plate of the pair.

Upon exiting the stamping press at table 36, the truss plates 40 are conveyed via a belt conveyor 38 to the orientation or stacking station 50. As illustrated herein, three plates are conveyed on the belt conveyor 38 in a transverse row; the plates are disposed in adjacent side-by-side relationship.

Figure 1C:
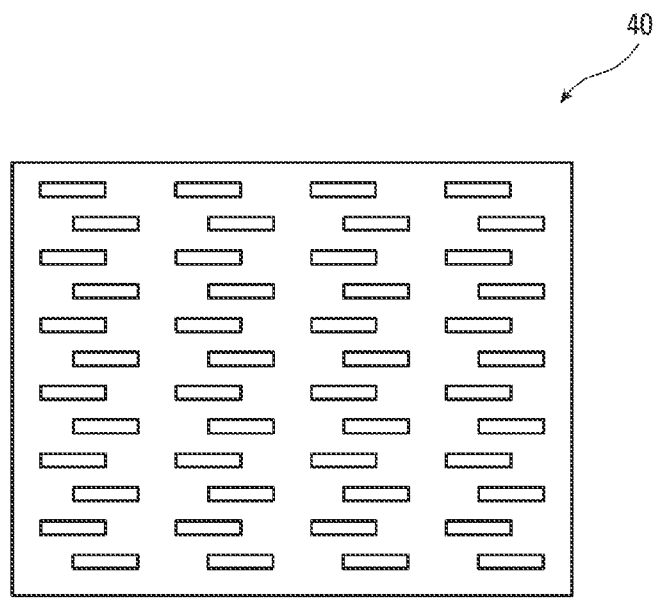
FIG. 1C is a plan view of two, interlocking truss-plates as a pair.

It should be understood that the stack illustrated in FIG. 1B is illustrative only. The truss plates may have any type of general configuration including the configuration shown in FIG. 1C.

Figure 2:
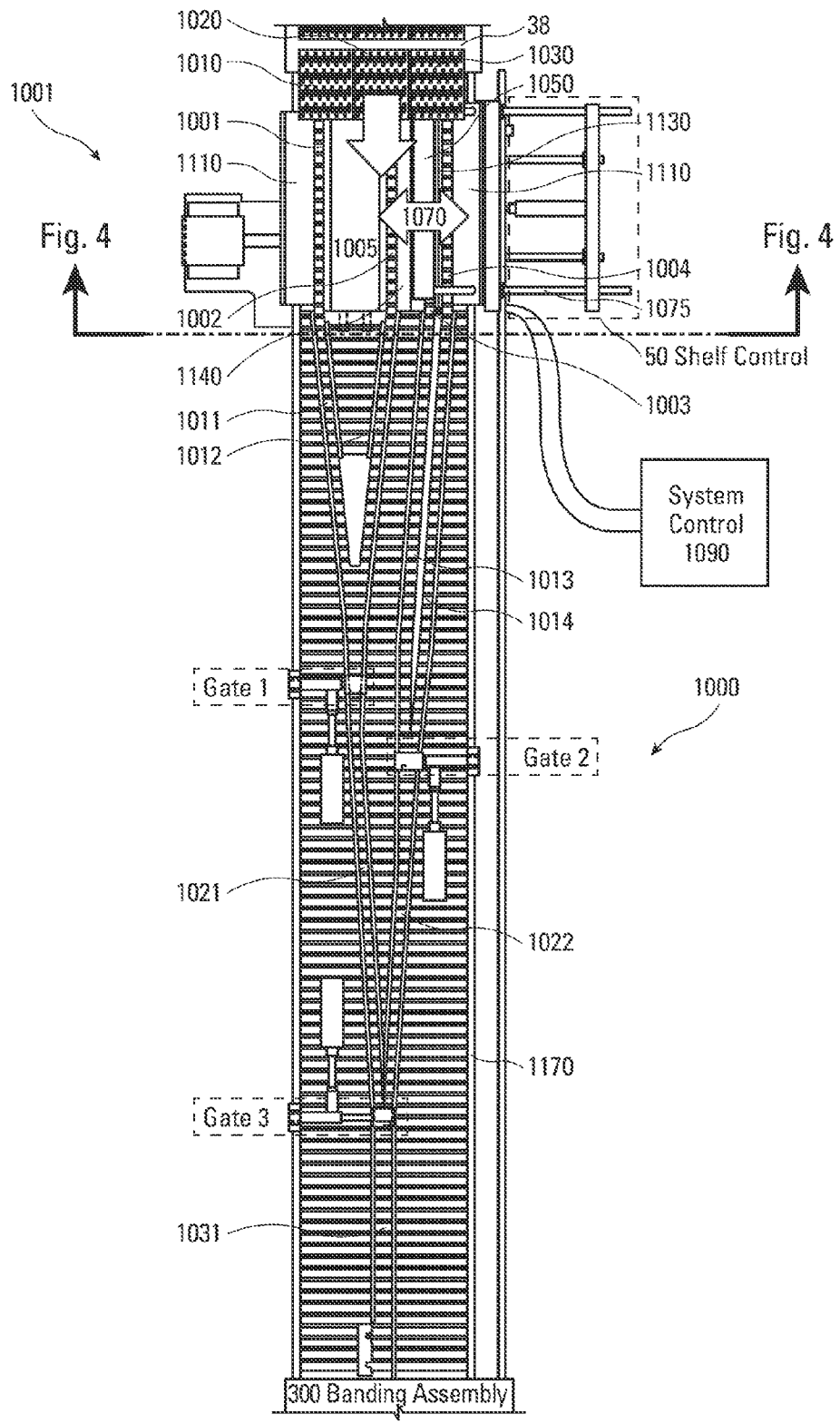
FIG. 2 is a plan view of a stacking or orientation assembly in accordance with the present technology.

FIG. 2 is a top, block level view of a stacking assembly 1000 in accordance with the present technology. Stacking assembly 1000 may comprise the stacking or orientation station 50 of FIG. 1. It should be understood that the depiction of the stacking system shown in FIGS. 2, 3A-3F, 4 and 5A-5I is illustrative only, and provided to understand the operation of the technology. The depiction is a block diagram and serves to illustrate the operation of the device.

It should be further understood that FIG. 2 and FIGS. 3A-3F are not to scale.

With reference to FIG. 2, stacking assembly 1000 receives an odd number of individual truss plates 1010, 1020, 1030 along conveyor 38 and station 50 from the press and coil reel as described above. The odd number of truss plates, in this case three, allows the use of different sizes of source steel. In one embodiment, a twelve inch width roll of steel can be used to form three four inch truss plates. Still, stacking assembly 1000 outputs two or four truss plates per cycle provided in a mated set to the banding assembly 300. A cycle is the entry of a truss plate at the input end of the stacker assembly, its combination with another truss plate into a mated pair, and its output to the banding device.

As illustrated in FIG. 2, a system controller 1000 controls the gates, motor and other mechanical elements used to enable the process flow described herein. Separate controllers may be provided for the banding apparatus and the press and roller. System controller 1000 may comprise a programmable logic controller controlling actuation of elements in the stacking assembly described below.

Plates exiting conveyor 36 will be provided into a receiving or input assembly and into one of four entry tracks 1001, 1002, 1003, and 1004. During each cycle, three of the four entry tracks are used and one is vacant. Tracks 1001 and 1002 are used during each cycle while one of tracks 1003 and 1004 are used during alternating cycles. The entry tracks feed a transport assembly such that a plate is provided down one of four transmission tracks 1011, 1012, 1013, or 1014, which lead to pairing channels 1021 and 1022 and eventually exit channel 1031.

Figure 3A:
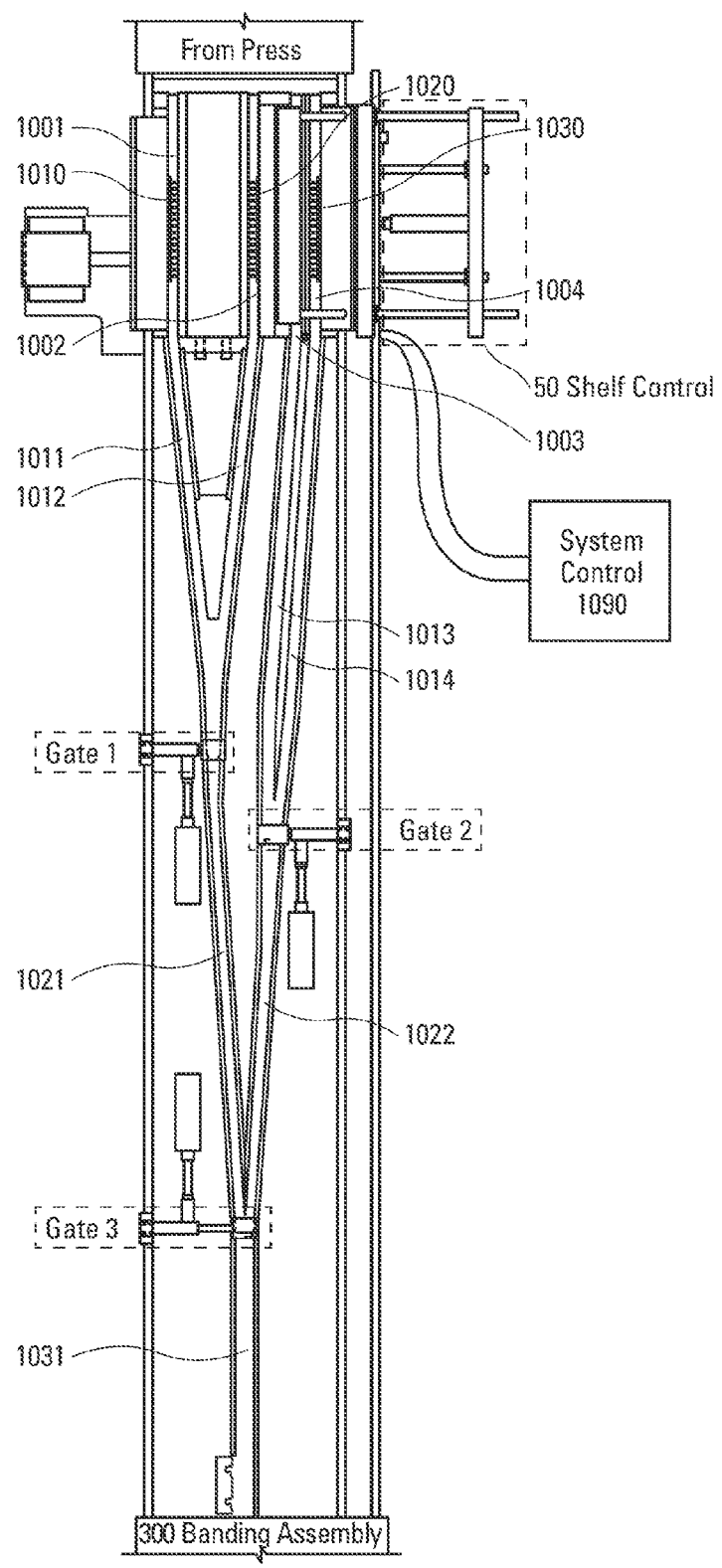
FIGS. 3A-3F are plan, block diagrams illustrating stacking of an odd number of plates into an even number of output plates over two cycles.
Figure 3B:
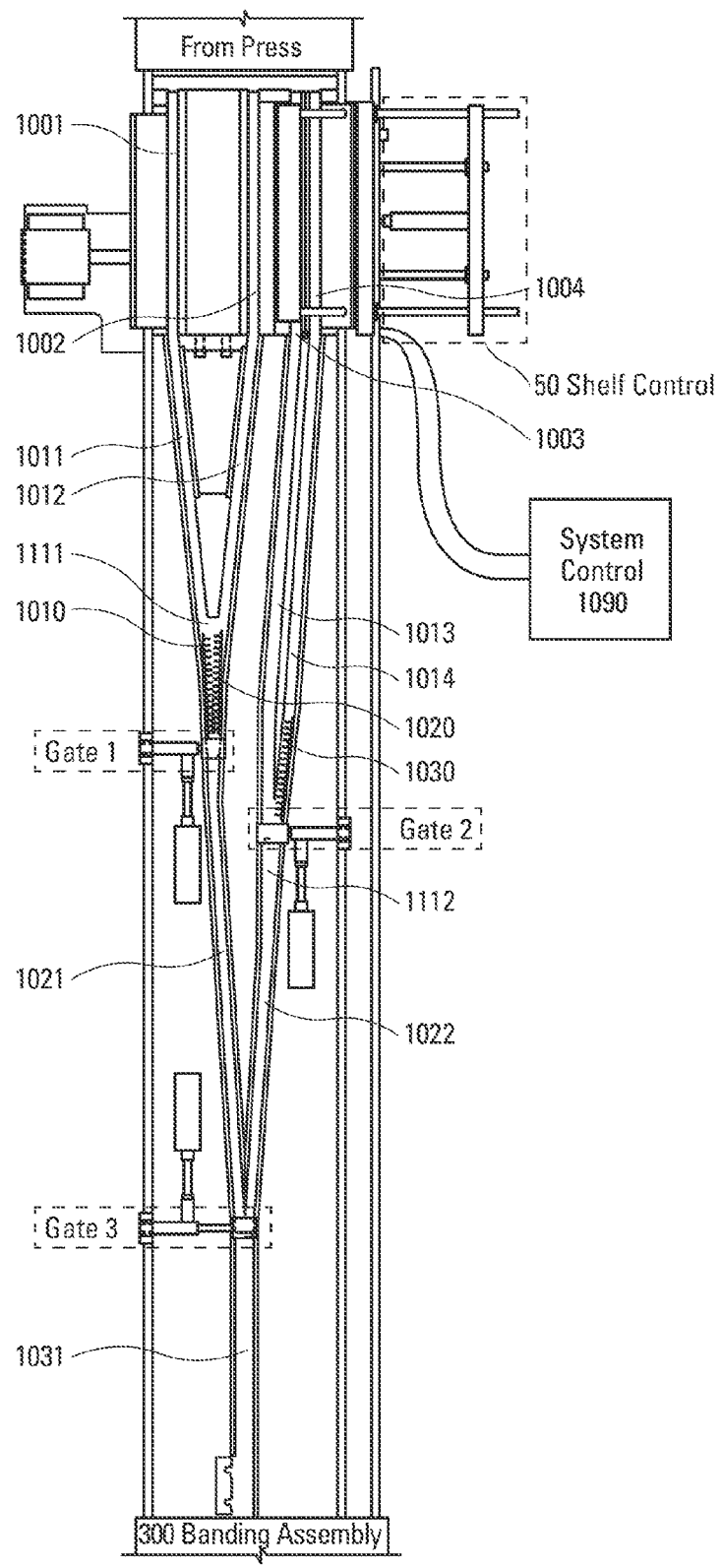
Figure 3C:
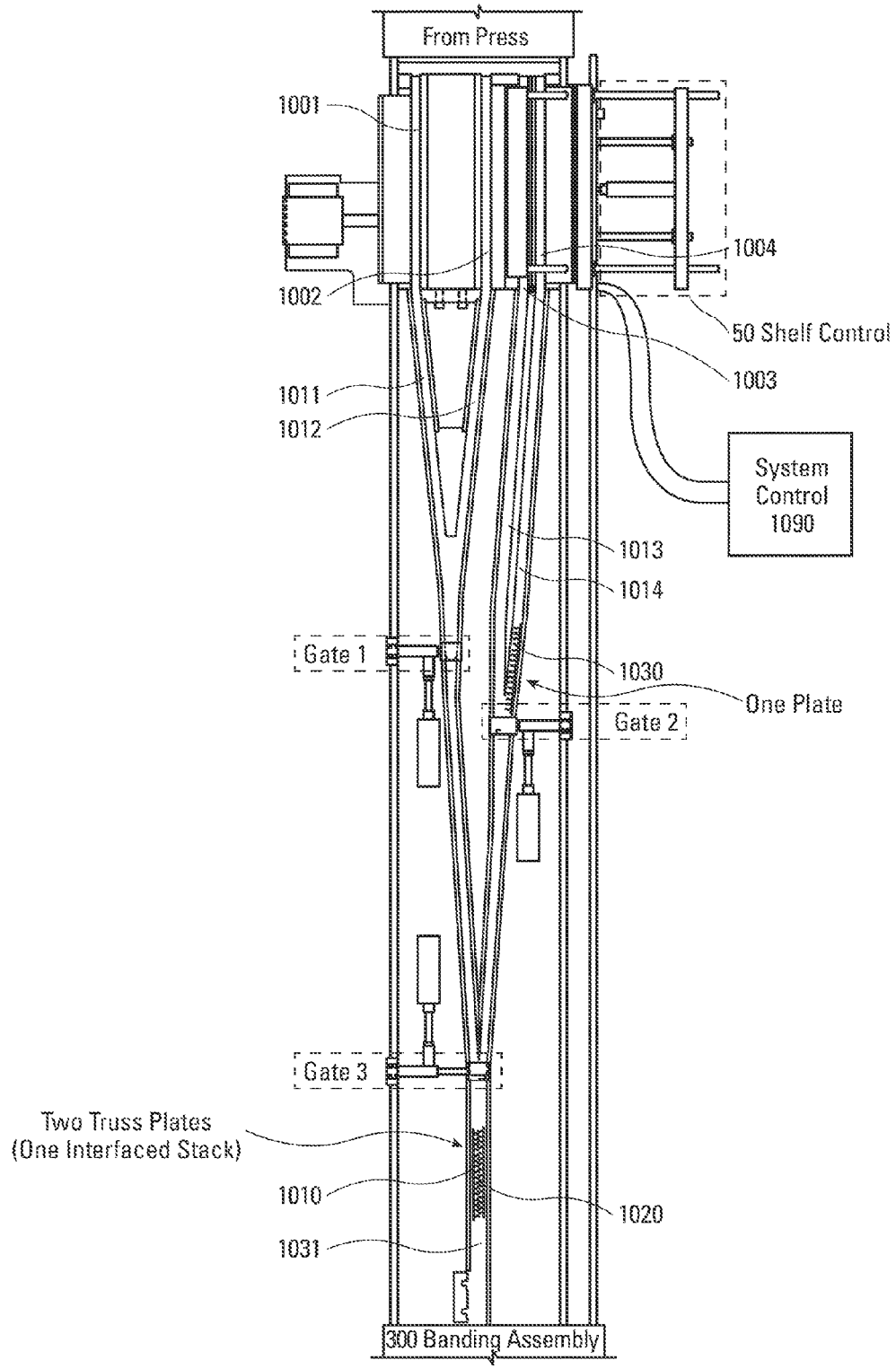
Figure 3D:
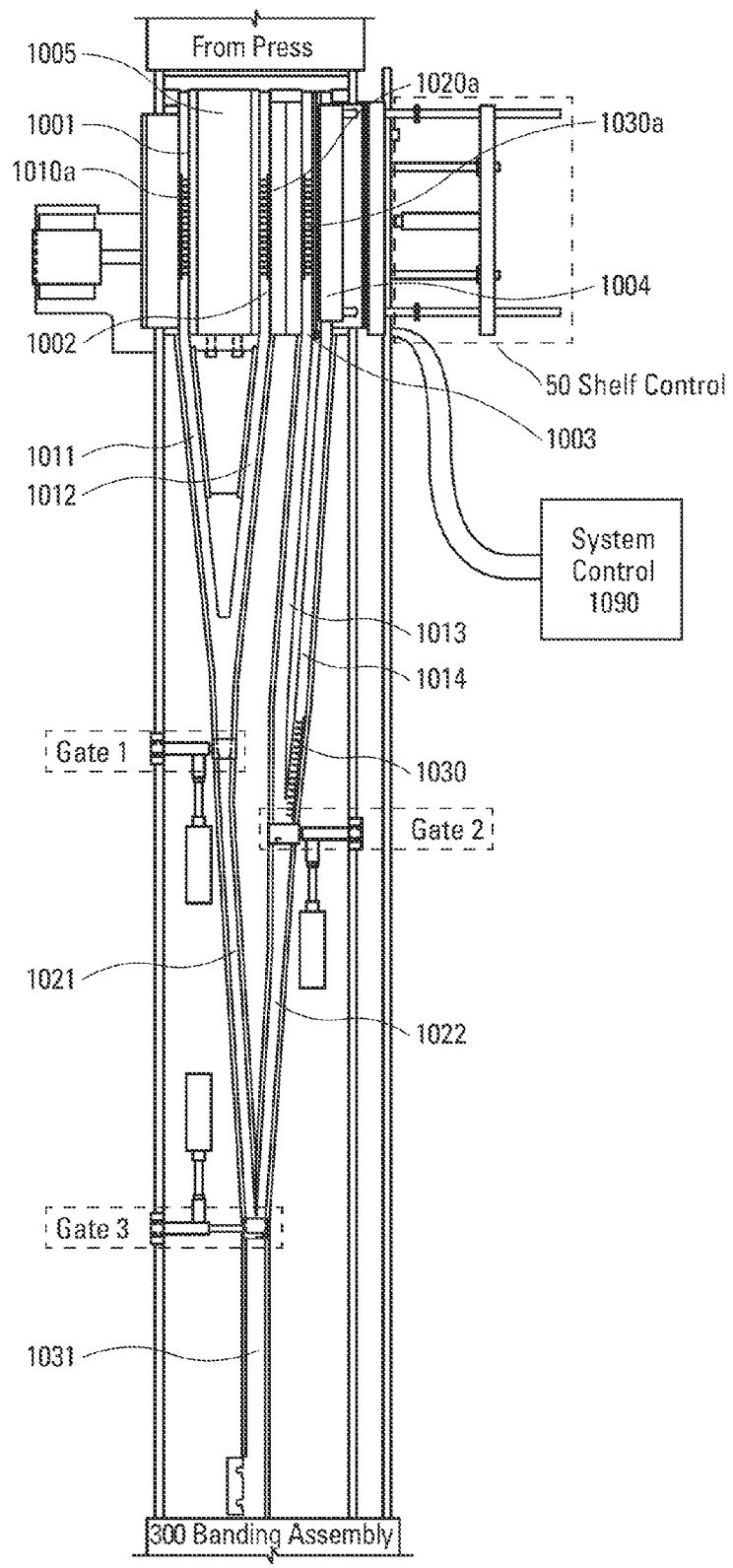
Figure 3E:
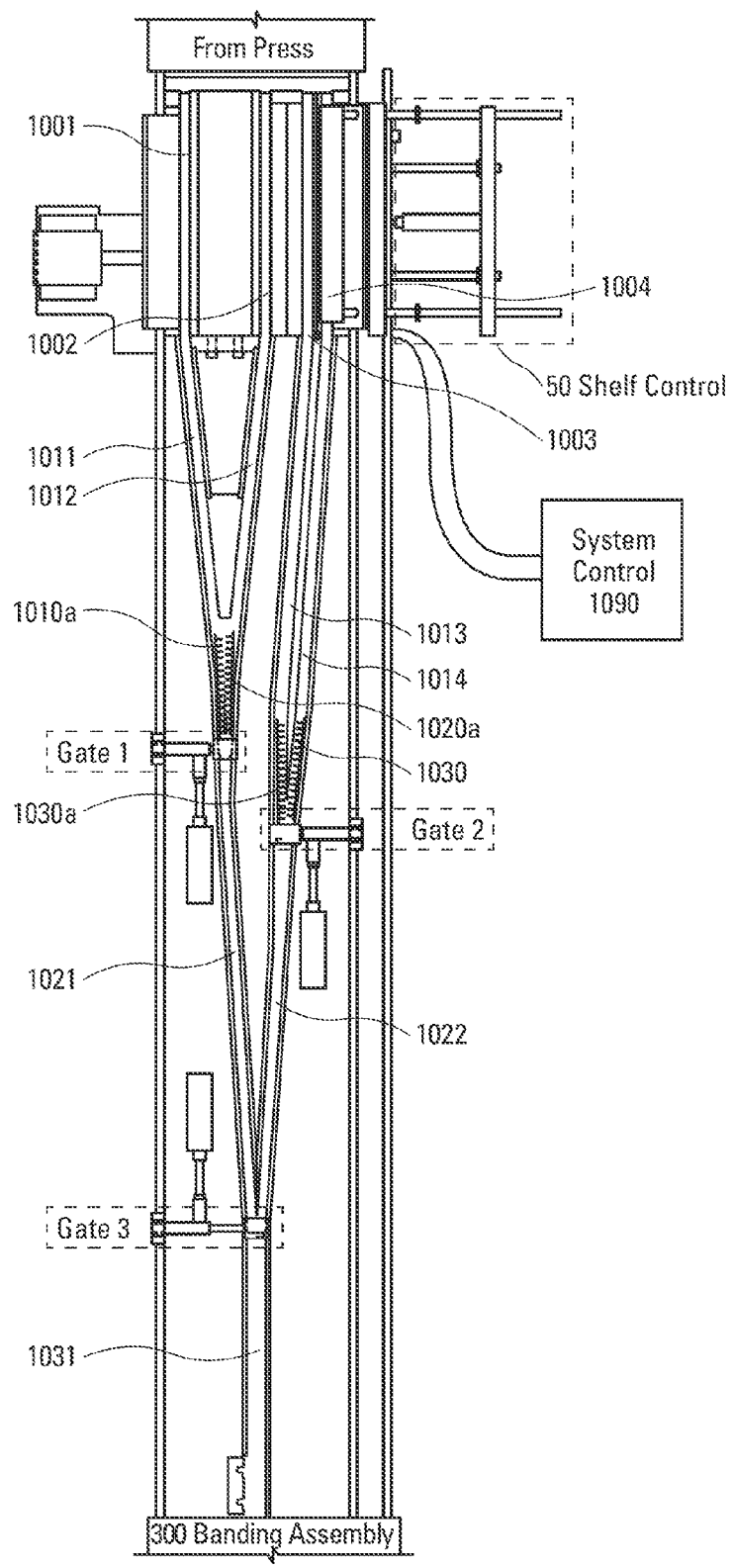
Figure 3F:
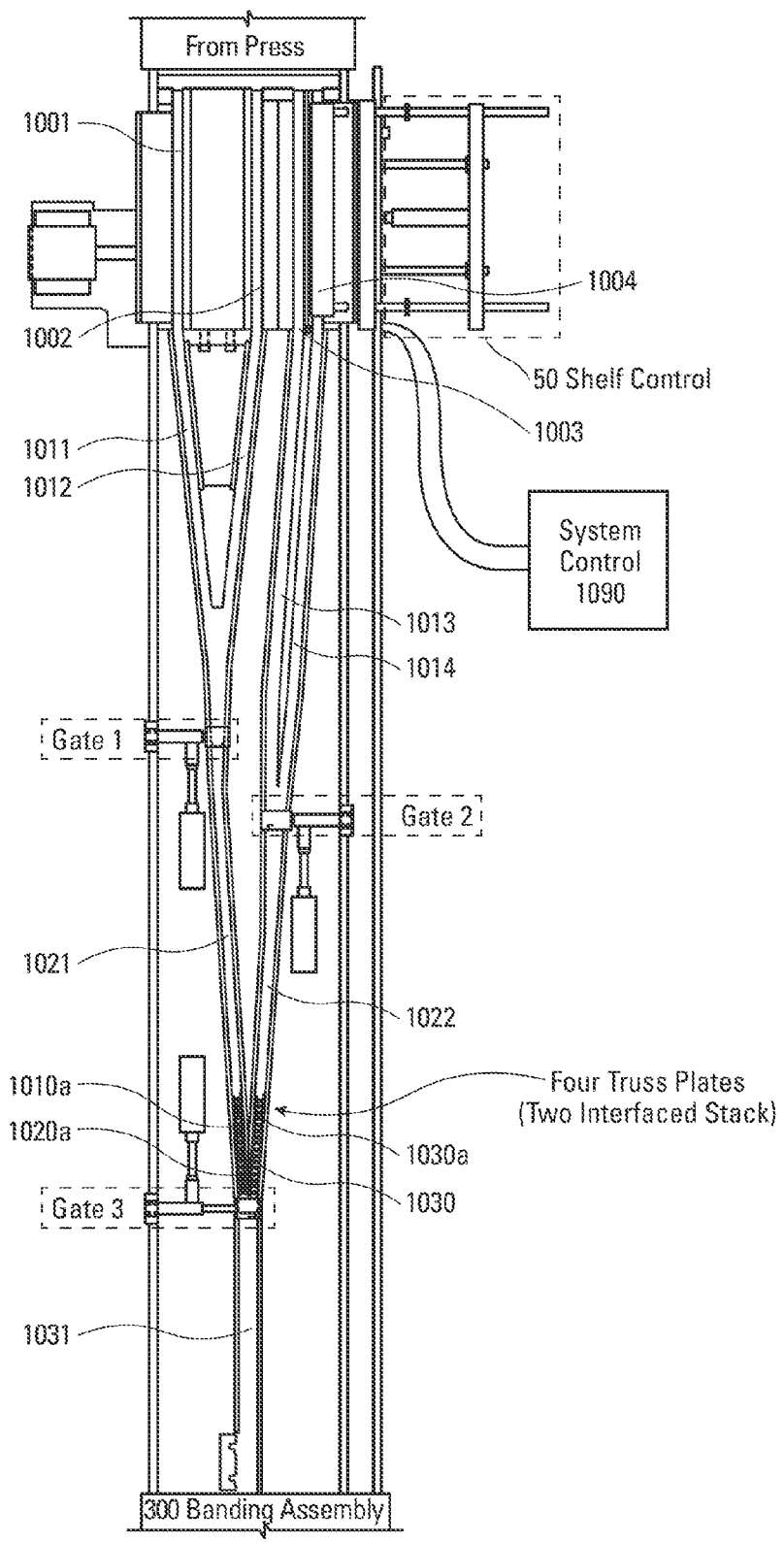
Figure 4:
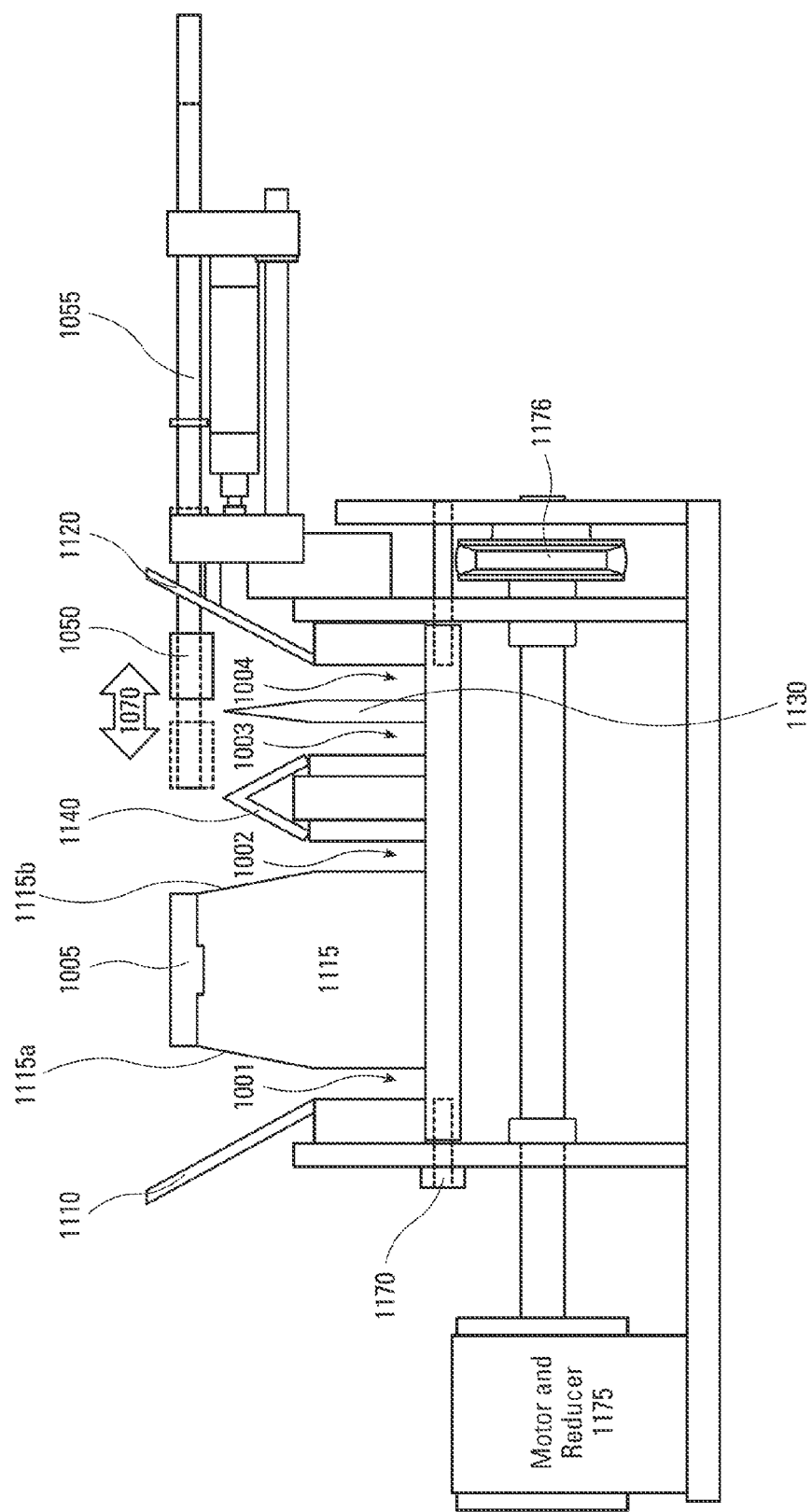
FIG. 4 is an end view of the assembly of FIG. 2 along line 4-4 in FIG. 2

FIG. 4 is an end view along line 4-4 in FIG. 2. FIGS. 3a-3f show operation of the odd to even stacking operation of the stacking assembly 1000. FIGS. 5A-5H illustrate how truss plates 1010, 1020 and 1030 enter the entrance channels 1001, 1002, 1003 or 1004.

Figure 5A:
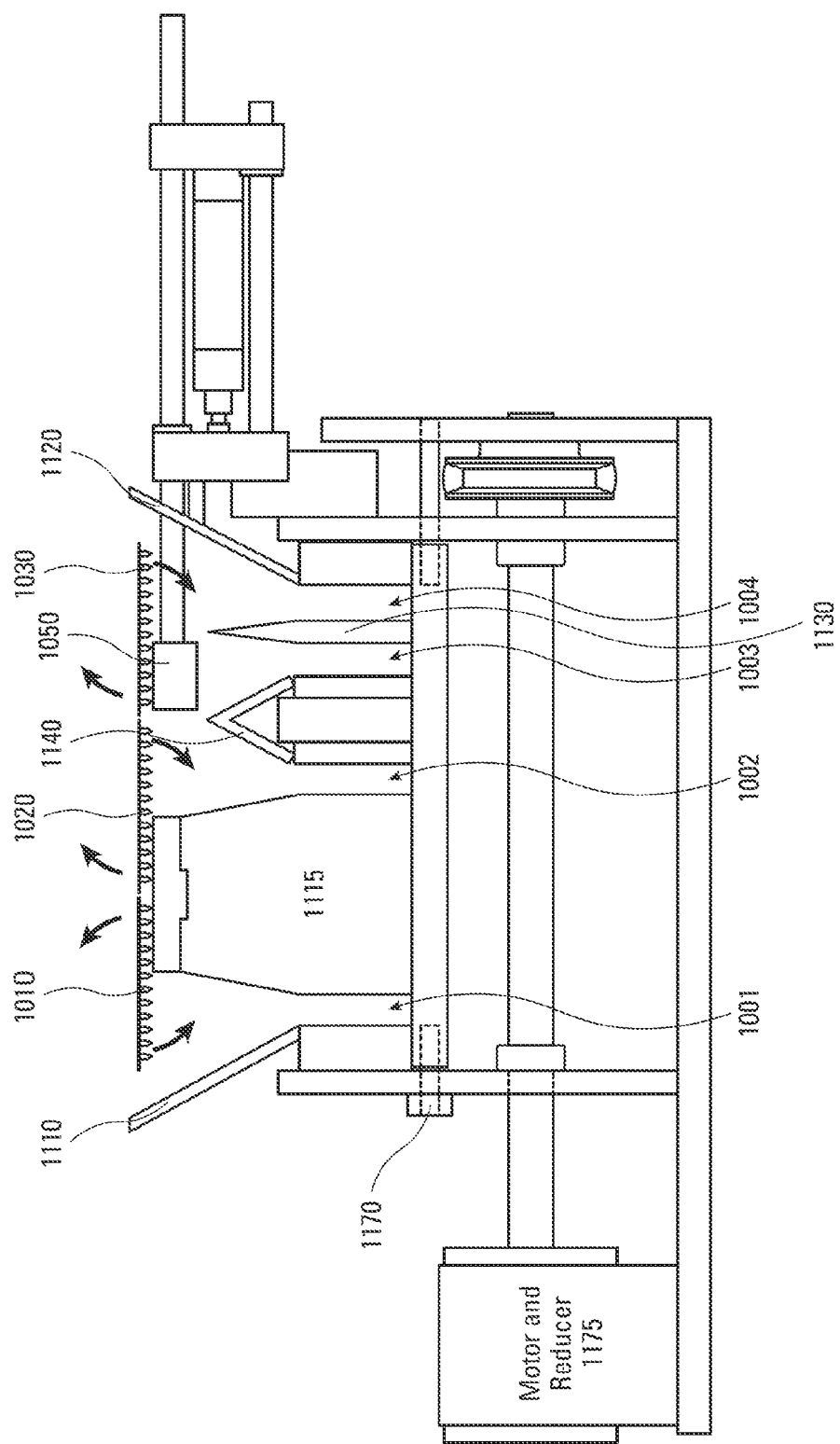
Figure 5C:
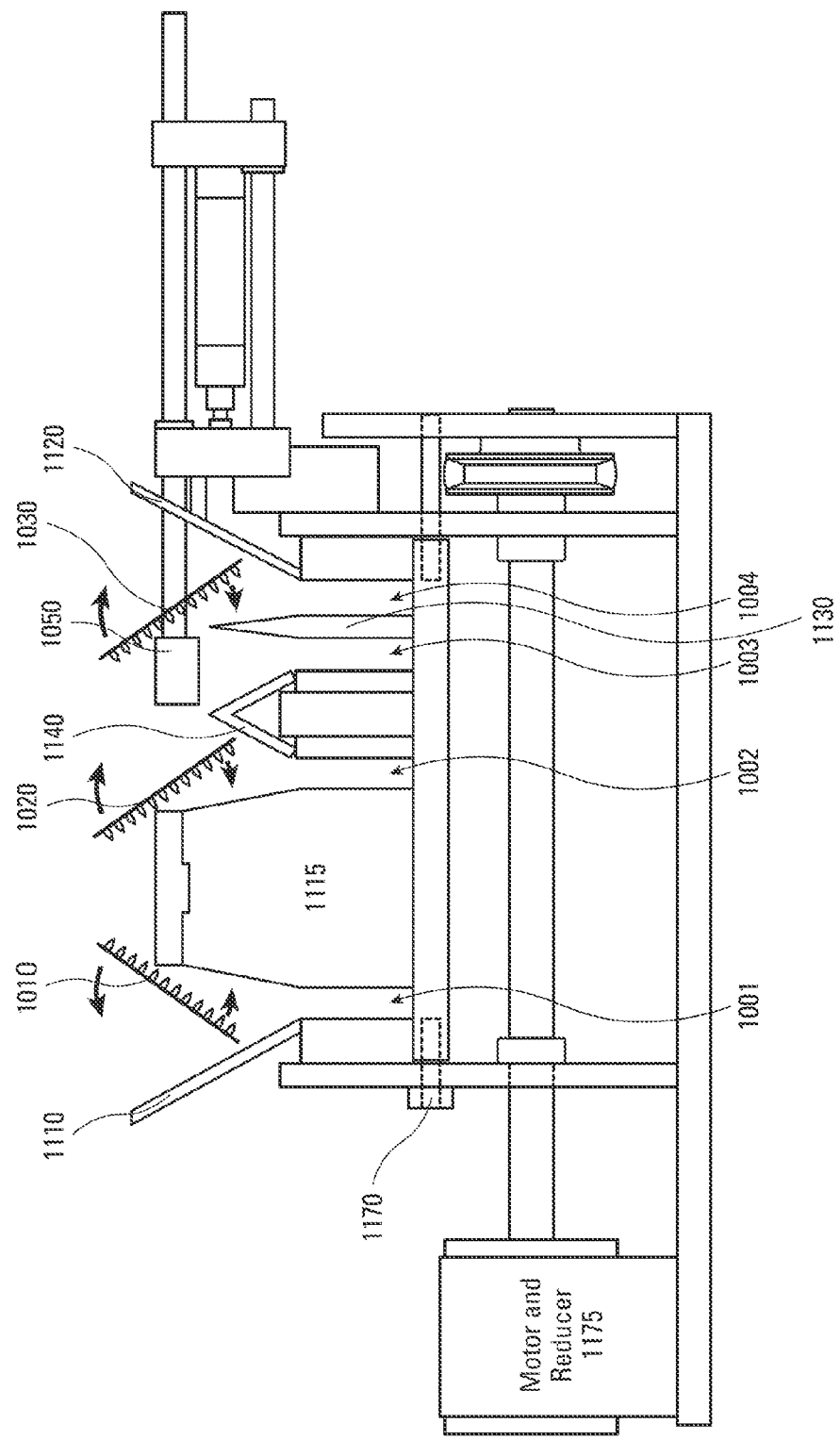
Figure 5D:
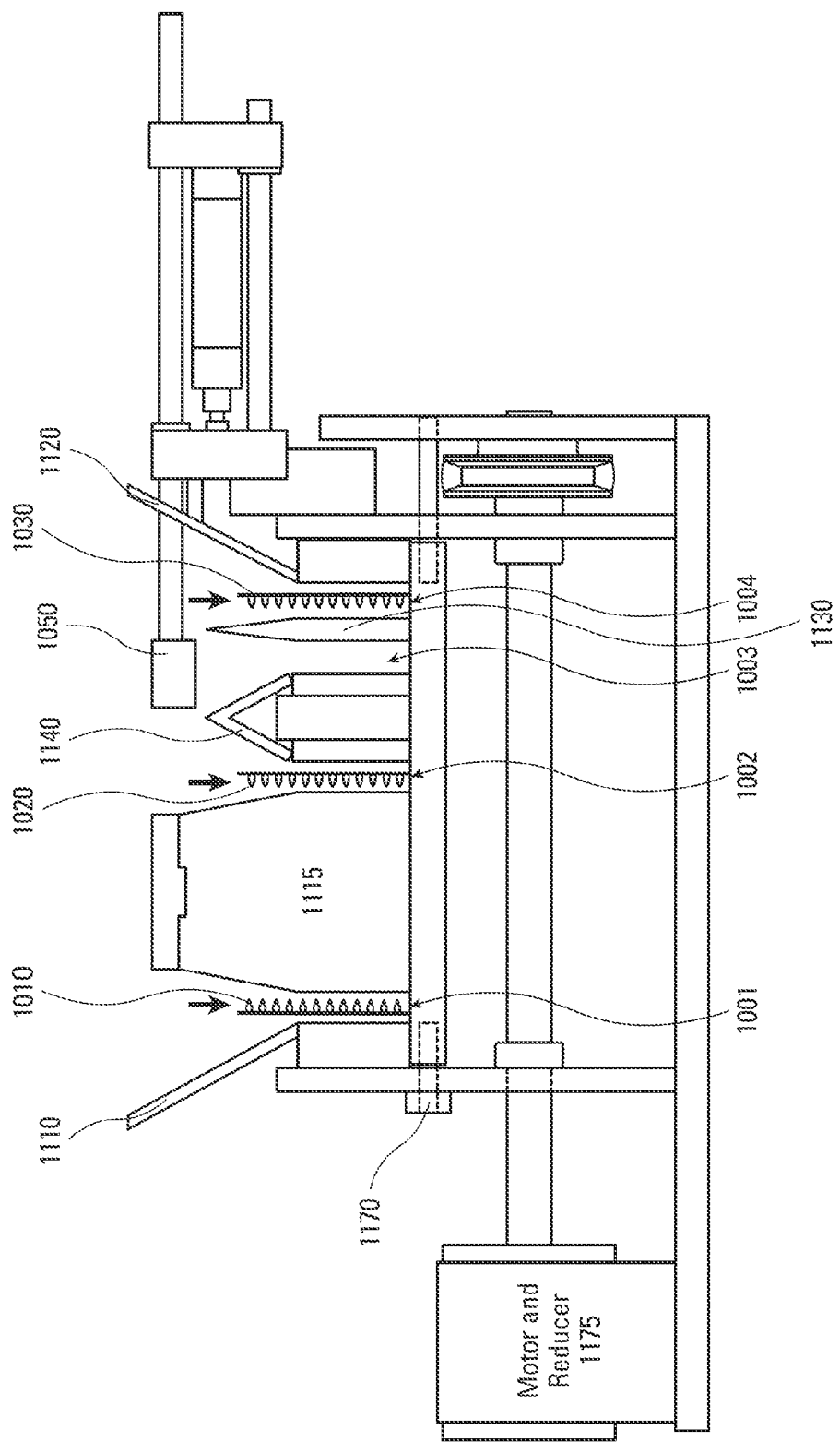
Figure 5E:
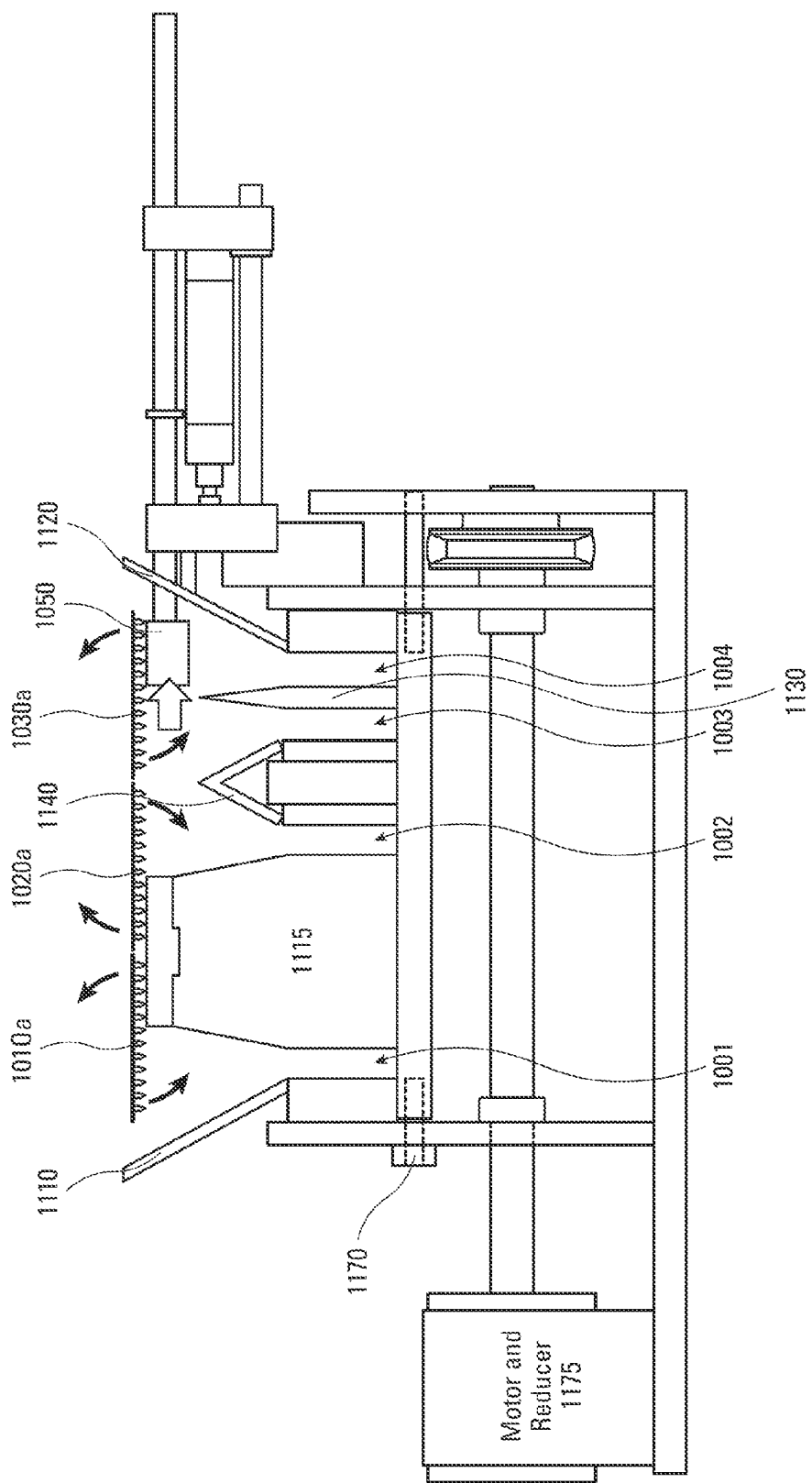

Stacker assembly 1000 includes a movable shelf 1050 which moves along arrows 1070 between a position shown in FIG. 2, 3A and alternative position shown in FIGS. 3D and 5E. Three stop gates, gate 1, gate 2, and gate 3, are shown as positioned on the assembly table 1090. Assembly table 1090 comprises a series of rollers 1170 which are powered by a motor generally illustrated in FIGS. 5A-5I. The rollers are powered steel rollers which rotate to move the truss plates along the entrance tracks, guide tracks, mating channels and exit channels. The surface tension between the rollers and the steel plates allows slippage when the gates retain the plates, but is sufficient to move the plates when they are not impeded in the rotational direction of the roller in the tracks. The shelf control, gates and motor powering the rollers is all operated by system controller 1002. All rollers 1170 are constantly running. The rollers may be ¾" steel rollers, provided ⅘ths inch apart.

In operation, three truss plates 1010, 1020, and 1030 are provided for each cycle of the stacking apparatus 1000. A number of successive stamping cycles provides a continuous flow of truss plates to the apparatus. The truss plates 1010, 1020, and 1030 enter from the conveyor 38 into the entry area. As the truss plates, 1010, 1020, 1030 are forced by conveyor 38 onto the entry shelf 1005 and 1050, the truss plates will be caused to fall and enter the entry channels 1001, 1002 and either 1003 or 1004 (depending on the position of shelf 1050). The plates 1010, 1020, 1030 move from being fully supported by the underlying conveyor or entry area to the entry regions, at first partially resting on shelf 105 and stationary shelf 1005. As they are moved forward, less than half of each plate is supported and falls under its own weight into the entry regions 1001-1004 as illustrated below. Shelf 1050 moves back and forth between the two positions illustrated in the figures to ensure a truss plate (1030, 1030a) falls into channels 1003 or 1004 each alternating cycle. Because there are three plates, the two left-most plates (as illustrated in FIG. 2), in this case 1010 and 1020, will always fall into tracks 1001 and 1002 during each cycle. The rightmost plate 1030 will fall into either track 1003 or 1004, depending on the position of the movable shelf 1050. After the plates fall into the entry channels, they are transported down the transport channels to be paired with another plate. Plates 1010 and 1020 will become one pair, while plate 1030 will pair with another "odd" plate in the next, subsequent cycle.

With reference to FIG. 5a-5F, the operation of the apparatus 1000 will be hereinafter described. In FIGS. 5a-5F, some elements of the device have been removed to increase clarity in illustrating the operation. In particular, the rollers are not illustrated in order not to obscure illustration of the movement of the plates through the system. Operation of the shelf 1050 and dropping of the plates 1010, 1020, and 1030, will be described below.

In FIG. 5A during a first cycle, truss plates 1010, 1020 will fall into channels 1001 and 1002. In addition, truss plate 1030 will fall into channel 1004. As noted above and described below with respect to FIG. 5A-5H, this occurs because of the weight of the plates as they are forced over the entry channels. Hence, an odd number (3) of plates have entered the stacking assembly 1000. It should be recognized that the prongs of the truss plates 1010 and 1020 are facing each other while the prongs of truss plate 1030 will be facing channel 1003. (Likewise, plates falling in channel 1003 during subsequent cycles will be facing channel 1004) Under power of the rollers 1170 underlying the assembly 1000, plates will be caused to move as shown in FIG. 5B towards the gates 1 and 2 down tracks 1011, 1012, and 1014. Once truss plates 1010 and 1020 moving down tracks 1011 and 1012 reach junction near gate 1, they will be mated and may, or may not, be held at gate 1 before they are allowed to pass through channel 1021 towards exit channel 1031. However, because only one truss plate, in this case truss plate 1030, is provided in channel 1014, gate 2 will be closed and hold truss plate 1030 within channel 1014 until a mating truss plate is provided as shown in FIG. 3C.

It should be notes that the outputs of tracks 1011 and 1012 feed directly to a region 1111 joining tracks 1011 and 1012 such that plates 1010 and 1020 are mated before reaching gate 1. Gate 2 is positioned before tracks 1013 and 1014 reach region 1112. In region 1112, plates 1030 and 1040 may be joined as discussed below.

Hence, as illustrated at FIG. 3C, two truss plates 1010 and 1020 are allowed to pass gate 1 and gate 3 and move towards the exit channel. Hence, during this initial cycle, the one set (two) of mated truss plates is output to stacking or banding assembly 300. One plate 1030 is held at gate 2 for the next cycle.

FIG. 3D shows the next cycle after a next set of plates (1010a, 1020a and 1030a) has entered the entry channels following the first cycle illustrated in FIGS. 3A-3C. At some point before the plates 1010a, 1020a and 1030a reach the stationary shelf 1005 and movable 1050, shelf 1050 is repositioned to the position shown in FIG. 3D (and FIG. 5E). This can occur immediately after the prior plate (1030) falls into the channel or at any point in the previous cycle before the next "odd" plate reaches the shelf 1050. It should be initially noted that the shelf 1050 is repositioned so that the rightmost truss plate, in this case truss plate 1030a will be to fall into channel 1003 rather than channel 1004.

FIG. 3D illustrates a point in time when a set of truss plates 1010A, 1020A and 1030A has been moved from conveyor 38 onto shelf 1005 and movable plate 1050 and caused to fall into channels 1001, 1002, and 1003. In a manner similar to that shown in FIG. 3A-3C, truss plates 1010a and 1020a will caused to mate into a single pair (FIGS. 3e and 3f), while truss plate 1030ab will mate with truss plate 1030 to form a second pair. As illustrated in FIG. 3E, truss plate 1030 waits for truss plate 1030A to reach gate 2. Once both truss plates are positioned at gate 2, gate 2 opens and allows the truss plates to move into channel 1022, while pair 1020A and 1010A move through channel 1021. When all four plates are aligned at gate 3, which may closed until all four gates are present at which point gate 3 opens and two pairs of truss plates exit at the exit channel towards banding assembly 300 as illustrated at FIG. 3f.

Alternatively, gate 1 and gate 2 may stagger their output, and gate three can be used to stagger the output of a four-truss-plate cycle to allow only one pair of truss plates to reach the exit channel 1031 during a cycle where four truss plates (two pairs) are ready for output. This allows stacking counts of any number of plates in an even manner to be provided to the output.

Shelf control 50 moves truss shelf 1050 back and forth as successive truss plates 1030, 1030A enter the entry area and are fed by the conveyor 38 into their respective channels. In this manner, an even number of paired truss plates, in mated assembly, can be provided to the banding assembly.

FIG. 3 is a block representation of an end view along line 5/5 in FIG. 2. FIG. 3 is provided as an end view illustration of the feed assembly from conveyor 36 into the entry area. Illustrated in FIG. 3 are the stationary shelf 1005, the moving shelf 1050, arrow 1070, and the shelf control piston 1055. Channels 1001, 1002, 1003, and 1004 are also illustrated. As illustrated in FIG. 3, the entry region includes angled walls 1110 and 1120 as well as element 1130 and structure 1115 having angled walls 1115A and 1115B allow plates to fall under the force of gravity when they overhang the regions above channels 1001, 1002, 1003, and 1004. As plates 1010 and 1020 enter shelf 1005, a greater surface area is suspended over the open space adjacent to the shelf than is supported by the shelf, causing the plate to tip under the force of gravity so that they fall into channels 1001 and 1002. Similarly, depending on a position of movable shelf 1050, a plate slid onto shelf 1050 will eventually fall in either channel 1003 or 1004. Rollers, 1170, are illustrated also. It should be understood that rollers 1170 run the entire length of the table 1090 illustrated in FIG. 2. Motor 1175 is also illustrated as well as drive wheel 1176 which is connected to rollers 1170 to drive the movement of any truss plates in the aforementioned channels illustrated in FIGS. 2 and 3.

FIG. 5A illustrates a first set of truss plates 1030, 1020, 1010 which have been moved onto the stationary shelf 1005 and movable shelf 1050 by conveyor 38 just prior to their tipping point. The position of the plates 1010, 1020, and 1030 in FIG. 5 is just prior to the point where gravity takes effect based on the position of the plates. Because the overhang of the plates over the open space underneath them is greater than the space of either supporting plate 1005 or movable plate 150, as shown in FIG. 5B, the plates will begin to fall over the edge of the respective plates 1005 and 1050 and fall as shown in FIGS. 5B, 5C eventually into a position as shown in FIG. 5D where they are at the base of channels 1001, 1002, 1004 and come under the force of the rollers 1170. The angled walls of elements 1150, 1130, 1140, and 1110, will ensure that the plates slide into the channel and find an upright position as illustrated in FIG. 5D. FIG. 5D is the position shown in FIG. 3a with plates resting in the channels prior to their movement through the channel into the stacking arrangement.

Figure 5F:
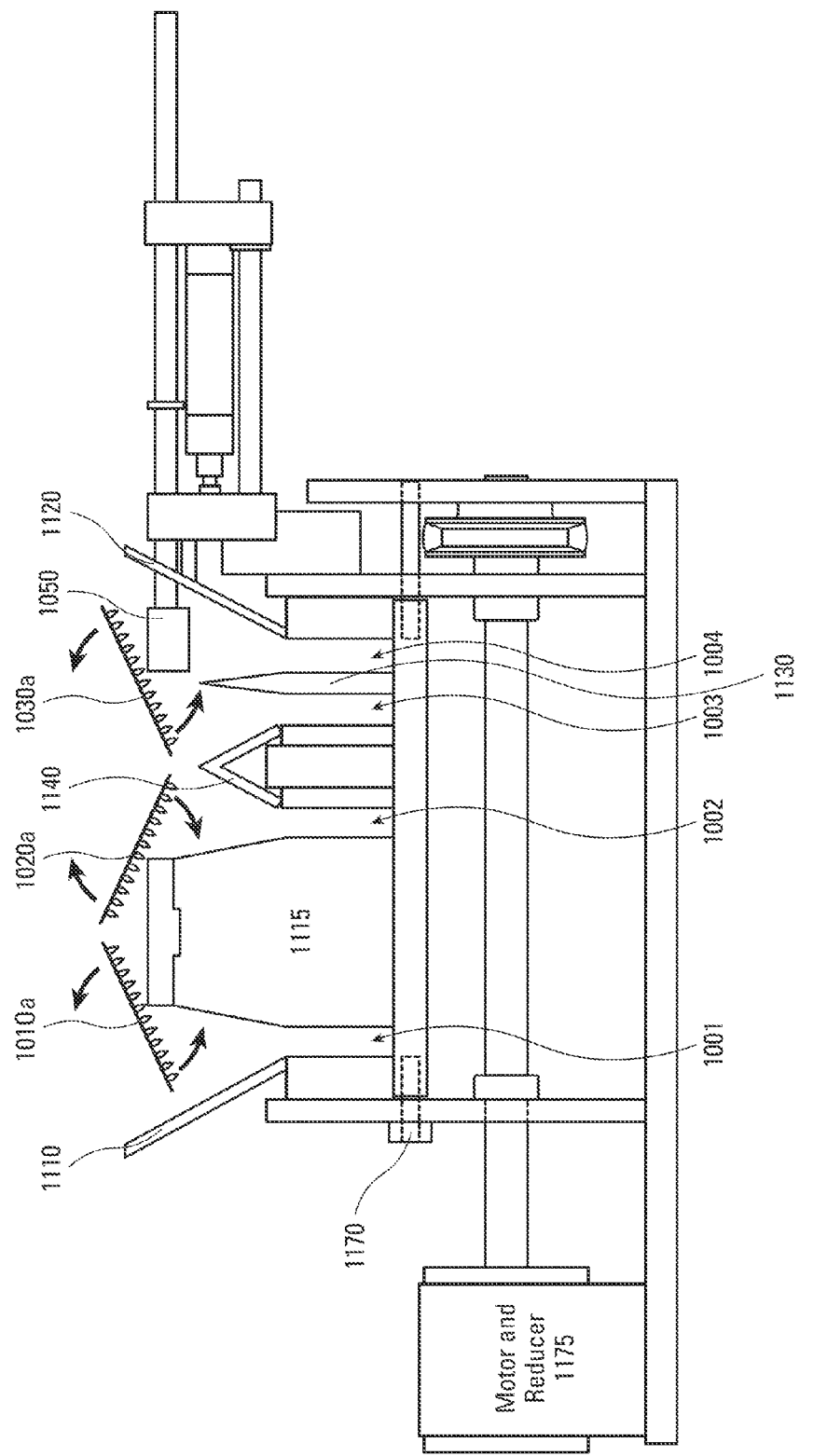
Figure 5G:
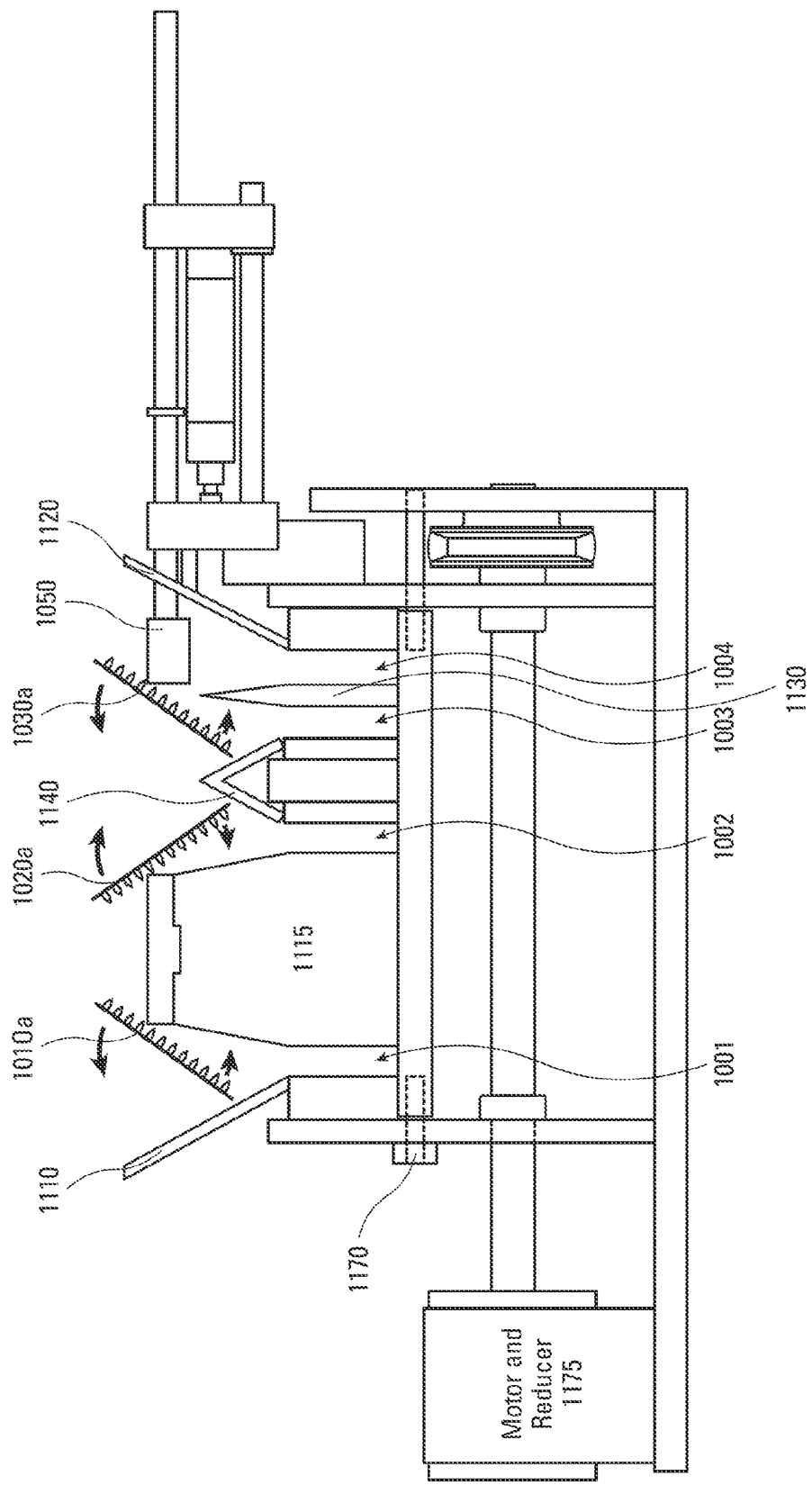

Once the plates come in contact with the rollers, they will begin to move. Because of the effects of gravity and the fact that the plates may fall at different rates after being pushed onto shelf 1005 and movable shelf 1050. Hence, the plates may not all enter the channels 1001-1004 at the same time during a given cycle, but will begin to move once they engage rollers 1170. The gates will be utilized to ensure that the timing of the plates at the exit channel 1031 is the same. As illustrated in FIG. 5E, movable shelf 1050 will be moved into a second position to allow a next plate 1030A as well as plates 1020A and 1010A, to be processed. As illustrated in FIGS. 5F, 5G and 5H, plate 1030A will fall into channel 1003 (with plates 1020A and 1010A falling into channels 1001 and 1002) to provide the aligning of plates illustrated in FIG. 3D. It will be understood that the truss plates 1010, 1020, 1030 and 1010A, 1020A and 1030A may all fall at different rates, and thus the synchronous position illustrated in the figures may not always be the case. It will further be understood that once the plates have reached the channel 1001, 1002, 1003 or 1004, the movable table 1050 will be shifted into return position to accept the next level of truss plate.

Table 1 is a table illustrating the cyclic movement of the tables in accordance with the present technology. After 20 cycles, the process flow repeats for the system.

It should be understood that various photo-eyes or other sensors may be provided to enable the system to more accurately move the gates. Additional gates, positioning structures and control elements may be provided to ensure that the truss plates are mated in the device.

The technology allows the use of, for example 12 inch wide rolled steel in the manufacture of truss plates. 12 inch wide steel is advantageous in that any number of sizes of plates can be manufactured from the 12 inch width, including 2×2, 3×3, 4×4 and 6×6 inch plates.

It should be further understood that the device may be gated based on the output of each cycle to provide a specific number of plates to the banding assembly. For example, it may be determined that at stack of 20 plates (10 pairs) is a commercially advantageous product. For such production run, the output gate (gate 3) may, in conjunction with gate 2, need to cause the output at the exit channel 1031 to provide only one pair during an odd cycle. However, the number of cycles will repeat periodically. As shown in Table 1, below, for a bundle of 20 plates, the cycle repeats after 20 cycles:

TABLE 1

| Cycle | Channels 1001 and 1002 | Channel 1003 or 1004 | Output This Cycle | Total Plates Output |
|---|---|---|---|---|
| 1 | 2 | 1 | 2 | 2 |
| 2 | 2 | 1 | 4 | 6 |
| 3 | 2 | 1 | 2 | 8 |
| 4 | 2 | 1 | 4 | 12 |
| 5 | 2 | 1 | 2 | 14 |
| 6 | 2 | 1 | 4 | 18 |
| 7 | 2 | 1 | 2 | 20 |
|  |  | Band 20 |  |  |
| 8 | 2 | 1 | 4 | 4 |
| 9 | 2 | 1 | 2 | 6 |
| 10 | 2 | 1 | 4 | 10 |
| 11 | 2 | 1 | 2 | 12 |
| 12 | 2 | 1 | 4 | 16 |
| 13 | 2 | 1 | 2 | 18 |
| 14 | 2 | 1 | 4 (2 × 2) |  |
|  | Allow 2 out Band 20; hold 2 at Gate 3 |  |  | 20 |
|  | Release 2 from gate 3 |  |  | 2 |
| 15 | 2 | 1 | 2 | 4 |
| 16 | 2 | 1 | 4 | 8 |
| 17 | 2 | 1 | 2 | 10 |
| 18 | 2 | 1 | 4 | 14 |
| 19 | 2 | 1 | 2 | 16 |
| 20 | 2 | 1 | 4 | 20 |
|  |  | Band 20 |  |  |
| Repeat |  |  |  |  |

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for stacking parts, comprising:
an input assembly adapted to receive a first odd number of parts in a first cycle and a second odd number of parts in a subsequent second cycle;
a transport assembly including plurality of tracks, ones of the first odd number of parts transported by the transport assembly toward a pairing output during the first cycle and ones of the second odd number of parts transported by the transport assembly toward the pairing output during the second cycle;
a first gate and a second gate positioned in the plurality of tracks;
a controller adapted to cause movement of parts in the first cycle so that a first even number of parts comprising ones of the first odd number of parts is provided at the output during the first cycle and a second, different even number of parts comprising the ones of the second odd number of parts and at least one of the first odd number of parts is provided at the output during the second cycle.

2. The apparatus of claim 1 wherein the first and second cycle are repeated continuously.

3. The apparatus of claim 1 wherein the first even number of parts is less than the second even number of parts.

4. The apparatus of claim 1 wherein the parts include truss plates having a flat side and a pronged side, and the input assembly includes a movable shelf, the shelf positioned in a first position during the first cycle and in a second position during the second cycle such that an odd plate in the first cycle falls into a first input channel in the first position and an odd plate in the second cycle falls into a second input channel in the second position.

5. The apparatus of claim 1 wherein the first gate is positioned to retain the at least one of the first odd number of parts, the first gate responsive to the controller to retain the at least one of the first odd number of parts during the first cycle.

6. The apparatus of claim 5 wherein the second gate is positioned to retain at least two of the second odd number of parts, the first gate is further positioned to retain at least one of the second odd number of parts, and the first and second gate are responsive to the controller to retain and subsequently release the at least one of the first odd number of parts and the second odd number of parts during the second cycle.

7. An apparatus for stacking truss plates, each truss plate having a flat side and a pronged side, comprising:
a controller;
an input assembly adapted to receive a first odd number of plates in a first cycle and to drop, responsive to the controller, each of the first odd number of plates into one of a plurality of input channels, and adapted to receive a second odd number of plates in a second cycle and to drop, responsive to the controller, each of the second odd number of plates into one of a plurality of input channels; and
a transport assembly adapted to move each of the odd number of plates toward an output, the controller operable to instruct the transport assembly to move the first odd number of plates such that two of the plates in the first odd number are mated and an odd plate is retained in the transport assembly and the two of the first odd number of plates are provided to the output, and the controller operable to instruct the transport assembly to move each of the second of the odd number of plates such that two of the plates in the second odd number of plates are mated and an odd plate in the second odd number of plates is mated with the odd plate retained in the transport assembly from the first odd number of plates, such that an even number of plates are provided to the output.

8. The apparatus of claim 7 wherein the input assembly includes a movable shelf, the shelf positioned in a first position during the first cycle and in a second position during the second cycle such that the odd plate in the first cycle falls into a first input channel in the first position and the odd plate in the second cycle falls into a second input channel in the second position.

9. The apparatus of claim 8 wherein the odd number of plates is three and the plurality of input channels is four.

10. The apparatus of claim 8 wherein the transport assembly includes a plurality of entry tracks coupled to receive plates from the input channels.

11. The apparatus of claim 10 wherein each entry channel is coupled to one of two pairing channels.

12. The apparatus of claim 11 wherein the pairing channels are coupled to an exit channel, the exit channel coupled to the output.

13. The apparatus of claim 12 further including a first gate positioned between two entrance channels and a first of the pairing channels and a second gate between two entrance channels and a second of the pairing channels.

14. The apparatus of claim 13 wherein the first gate is positioned in the pairing channel, the controller is adapted to close the gate to allow two plates to mate before reaching the gate.

15. The apparatus of claim 13 wherein the second gate is positioned at an end of two entrance channels such that two plates may not completely mate before reaching the gate.

16. The apparatus of claim 7 further including a plurality of powered rollers underlying the input assembly and the transport assembly, the powered rollers transporting the plates through the input and transport assembly to the output.

17. An apparatus for stacking truss plates, each truss plate having a flat side and a pronged side, the apparatus receiving three truss plates provided simultaneously on a conveyor to the apparatus, comprising:

a loading assembly adapted to receive three plates in each cycle, and adapted to provide each of the three plates to four input channels underlying a stationary shelf and a movable shelf, the input channels adapted to receive a first three plates in a first cycle and adapted to position the movable shelf in a first position during the first cycle, each of the first three plates being received and falling into one of three input channels during the first cycle, the channels adapted to receive a second three plates during a second cycle, the loading assembly adapted to position the movable shelf in a second position during the second cycle, each of the second three plates falling into two of the three input channels and a fourth input channel during the second cycle;

a roller and transport track assembly adapted to move each of the three plates toward an output such that two of the first three plates are mated and an one of the first three plates is retained in the assembly during the first cycle, with the two of the three plates provided to the output during the first cycle, and adapted to move each of the second three plates such that two of the second three plates of the second cycle are mated, and an one of the second three plates is mated with the one of the first three plates, such that an even number of plates is provided to the output during the second cycle.

18. The apparatus of claim 17 further including a plurality of entry tracks coupled to receive plates from the input channels, entry track is coupled to one of two paring channels, and a plurality of powered rollers underlying the input channels and entry tracks, the powered rollers transporting the plates through the input and transport assembly to the output.

19. The apparatus of claim 18 further including a first gate positioned between two entrance tracks and a first of the pairing channels and a second gate between two entrance tracks and a second of the pairing channels.

20. The apparatus of claim 19 wherein the first gate is positioned in one of the two pairing channel allowing two plates to mate before reaching the gate and wherein the second gate is position at an end of two entrance tracks such that two plates may not completely mate before reaching the gate.

* * * * *